United States Patent
Saberan et al.

(10) Patent No.: US 7,255,384 B2
(45) Date of Patent: Aug. 14, 2007

(54) VEHICLE SEAT THAT TIPS AND KNEELS AND FOLDS INTO A STOWAGE WELL

(75) Inventors: Mohammad Saberan, New Baltimore, MI (US); James Klein, Rochester Hills, MI (US); David Kolena, Bloomfield Hills, MI (US); Brian D. Phillips, Almont, MI (US); Artur W. Dlugosz, Sterling Heights, MI (US); Sanjay Vakil, Troy, MI (US); Fred Kresky, Rochester Hills, MI (US); Kyle Calvert, Sterling Heights, MI (US); Paul J. Glinka, Waterford, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/163,827

(22) Filed: Nov. 1, 2005

(65) Prior Publication Data

US 2007/0096496 A1 May 3, 2007

(51) Int. Cl.
*B60N 2/12* (2006.01)
*B60N 2/30* (2006.01)

(52) U.S. Cl. .............. 296/65.09; 296/65.05; 296/65.13; 296/65.16; 297/344.1

(58) Field of Classification Search ............ 296/64, 296/65.04, 65.06, 65.13, 65.16, 37.14, 65.05, 296/65.09; 297/15, 344.1, 337
See application file for complete search history.

(56) References Cited

U.S. PATENT DOCUMENTS

| | | | |
|---|---|---|---|
| 4,475,769 A | 10/1984 | Crawford et al. | |
| 4,699,418 A * | 10/1987 | Plavetich | 296/65.09 |
| 5,195,795 A | 3/1993 | Cannera et al. | |
| 5,269,581 A | 12/1993 | Odagaki et al. | |
| 5,527,087 A * | 6/1996 | Takeda et al. | 297/15 |
| 5,570,931 A | 11/1996 | Kargilis et al. | |
| 6,089,641 A | 7/2000 | Mattarella et al. | |
| 6,099,072 A | 8/2000 | Sturt et al. | |
| 6,129,404 A | 10/2000 | Mattarella et al. | |
| 6,196,613 B1 * | 3/2001 | Arai | 296/65.13 |
| 6,375,255 B1 * | 4/2002 | Maruta et al. | 297/15 |

(Continued)

OTHER PUBLICATIONS

Doge Caravan and Grand Caravan Seating/Storage, www.dodge.com/caravan/seating_storage.html, pp. 1-2.

(Continued)

*Primary Examiner*—D. Glenn Dayoan
*Assistant Examiner*—Greg Blankenship
(74) *Attorney, Agent, or Firm*—Brooks Kushman P.C.

(57) ABSTRACT

A vehicle seat assembly is attached to a floor attachment bracket by pivoted front and rear leg assemblies is disclosed. A seat base frame, the floor attachment bracket and the front and rear leg assemblies form a four bar link that support the seat assembly on a floor pan of a vehicle. The floor pan defines a stowage well in which the seat assembly may be selectively stored. The four bar link may be rotated to a limited extent when the seat back frame is in its normal seating position to provide a tip and kneel position. In the tip and kneel position the seat is disposed intermediate the seating position and fully stowed position with the seat back upright to provide improved ingress and egress to areas of the vehicle behind the seat assembly.

16 Claims, 4 Drawing Sheets

U.S. PATENT DOCUMENTS

| | | | |
|---|---|---|---|
| 6,629,721 B1 * | 10/2003 | Macey | 297/15 |
| 6,827,388 B2 * | 12/2004 | Kayumi et al. | 296/64 |
| 6,874,840 B2 | 4/2005 | Neale | |
| 6,962,384 B2 * | 11/2005 | Rhodes et al. | 296/66 |
| 6,997,498 B2 * | 2/2006 | Oyama | 296/65.05 |
| 2004/0100114 A1 | 5/2004 | Rhodes et al. | |
| 2004/0100117 A1 | 5/2004 | Rhodes et al. | |
| 2004/0124682 A1 | 7/2004 | Daniel | |

OTHER PUBLICATIONS

Ford Galaxia Bodies, Ford Car Facts Book, 1963, Section C, p. 31.
Fairlane Bodies, Ford Car Facts Book, Section C, pp. 16-17.
Sportwagon, pp. 42-47.
Photos of 1968 Buick Sportwagon, pp. 1-5.

* cited by examiner

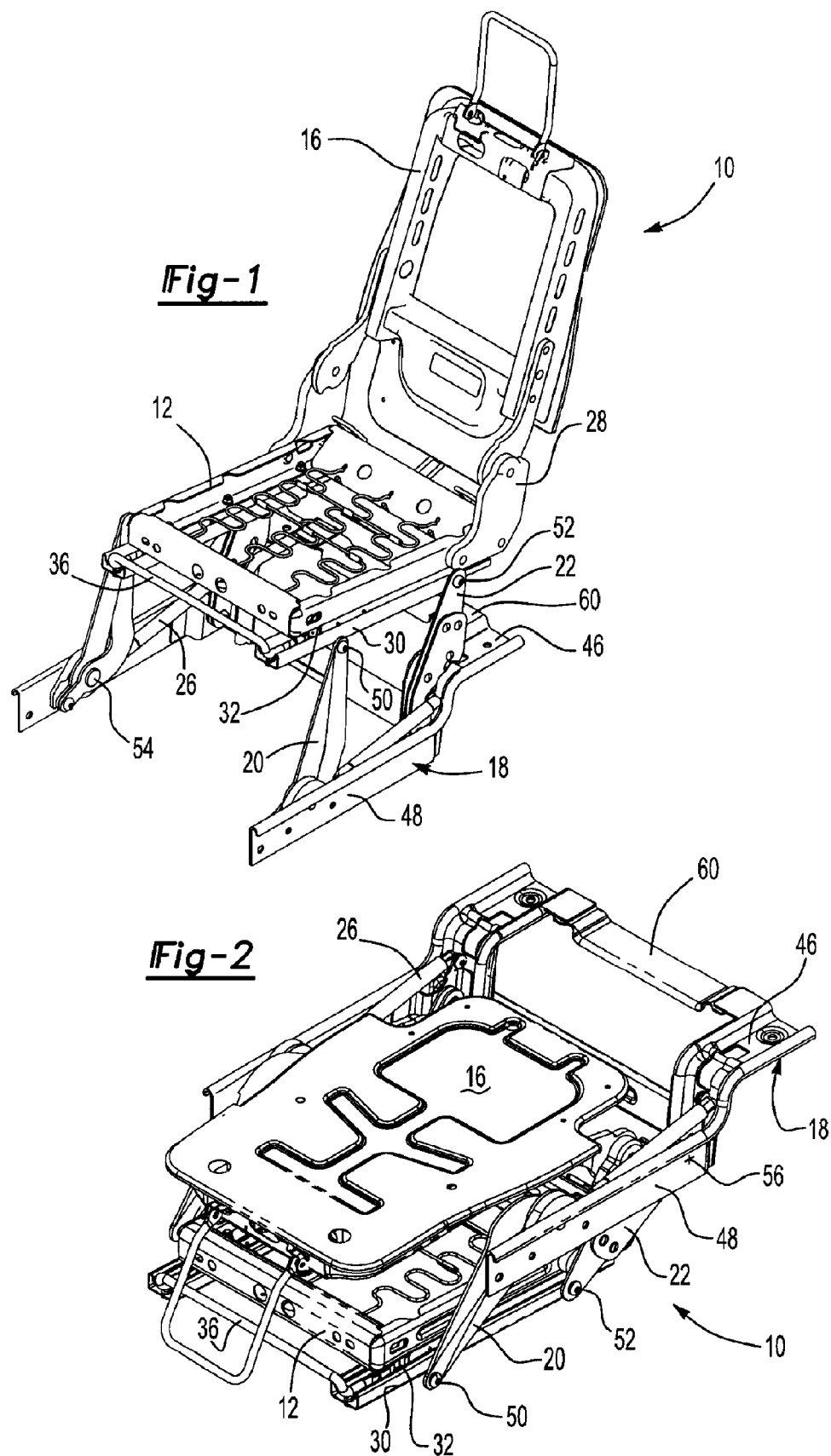

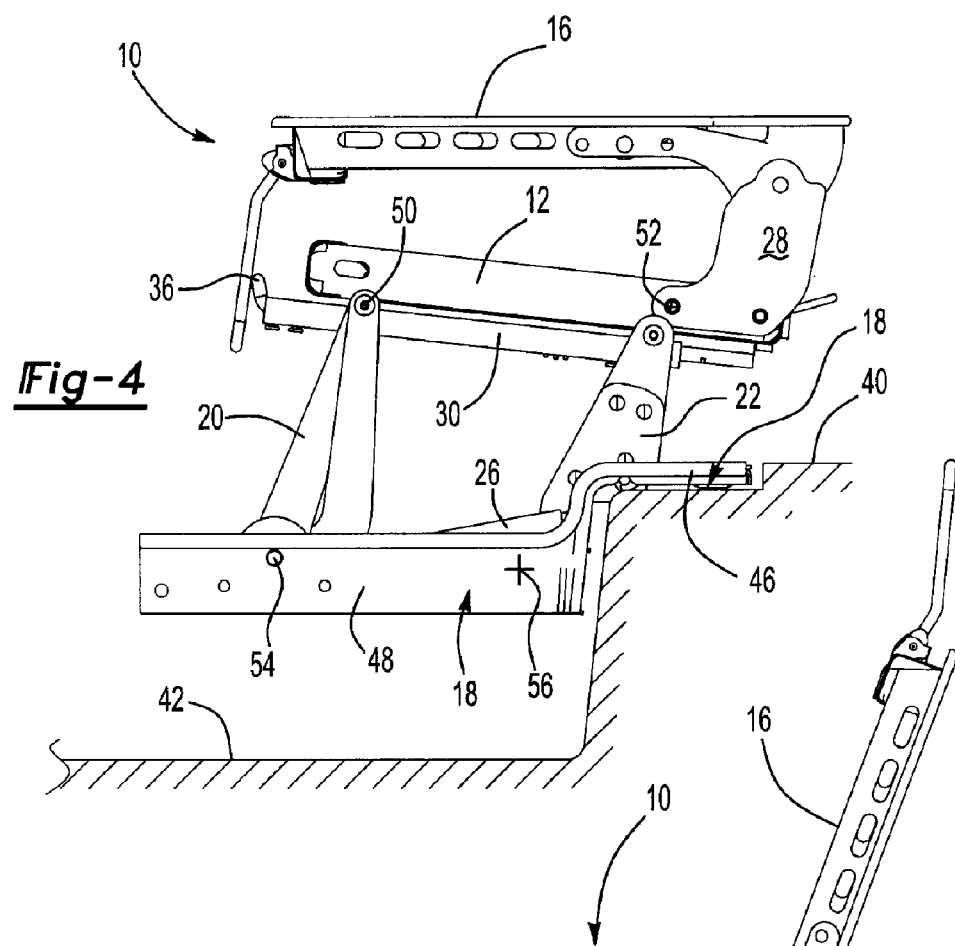
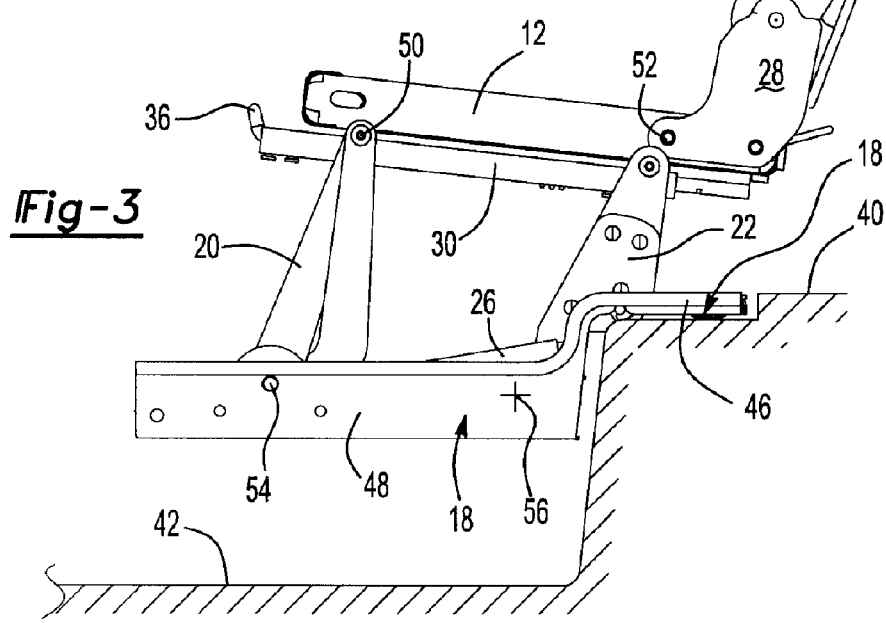

VEHICLE SEAT THAT TIPS AND KNEELS AND FOLDS INTO A STOWAGE WELL

BACKGROUND OF THE INVENTION

1. Field of the Invention

The present invention relates to vehicle seat assemblies that may be folded into a sub-floor stowage well or that may be moved to a tip and kneel position for improved ingress and egress.

2. Background Art

Vehicle seats for sport utility vehicles (SUVs), vans and other special purpose vehicles contribute to the versatility of such vehicles. Seats for such vehicles may be converted between a seating position and a storage position, or may be completely removed from the vehicle. Generally, such seats are folded against the floor portion of a floor pan of the vehicle. In this position, the seats provide increased storage volume, but when the seats are folded down they still take up valuable cargo space.

If three or more rows of seats are provided in an SUV or a van the second row of seats tend to block ingress and egress to the rear most row of seats. Persons attempting to enter or exit the rear most row of seats may be required to squeeze between the second row of seats and the door frame or fold the seats down to a storage position. If the seats are folded down, a person must climb over the folded seats to obtain access to the rear most row of seats.

It is an object of the invention to provide a vehicle seat that may be stored below the floor of the vehicle to maximize the cargo carrying capacity of the vehicle. There is also a need for a vehicle seat that may be moved forwardly and downwardly to a position that provides improved access for ingress and egress to seats or cargo areas behind the second row of seats in the vehicle.

SUMMARY OF THE INVENTION

According to one aspect of the present invention, a seat assembly for a vehicle is provided that is assembled to a floor pan of the vehicle. The floor pan of the vehicle has a stowage well formed below the nominal floor of the vehicle. The seat assembly comprises a seat and an articulated base that secures the seat to the floor pan. A locking system is provided for locking the base in a seating position. The locking system is released using a first procedure to allow the seat to be tipped forward and downward toward the stowage well to a limited extent to an intermediate position above the stowage well. The locking system is also released according to a second procedure to allow the seat to be stowed in the stowage well.

According to other aspects of the invention, the articulated base may have a set of front legs and a set of rear legs that are connected at four pivot axes to the seat and the floor pan. The base supporting structure forms a parallelogram that may be positioned in the intermediate position or alternatively in the stowage well. Two of the pivot axes of the base are positioned in the stowage well and remain at all times below the nominal floor of the vehicle. The other two pivot axes are moved between an above floor position and a sub-floor position.

The seat may further comprise a seat base and a seat back with the seat back being pivoted on an axis located adjacent the lower end of the seat back and the back end of the seat base. The seat back may be pivoted between a rearwardly inclined upright position and a folded position in which the seat back lies upon the seat base in a generally parallel relationship to the seat base. The seat back may be in the upright position when the seat is in the seating position and when the seat is in the tipped forward position. The seat back may be in the folded position when in the stowage compartment and may also be in the folded position when in a table or console position.

According to another aspect of the present invention, a seat assembly is provided for a vehicle having a floor pan that includes a seat stowage well formed below a floor defining portion of the floor pan. The seat assembly comprises a seat base and a seat back. A four bar link connects the seat base to the floor pan of the vehicle. A fore-and-aft seat adjustment track is provided between the seat base and the four bar link for positioning the seat base and seat back relative to the four bar link.

According to other aspects of the invention, the four bar link has two lower pivot axes fixed in the stowage well and two upper pivot axes that are provided in a fixed relationship relative to the seat base. The two upper pivot axes move with the seat base between a seating position and a stowed position. The two upper pivot axes may be moved with the two upper pivot axes being rotated forward and downwardly on the two lower pivot axes to move the seat assembly toward either the stowed position or the kneeled position. The seat assembly should be in the rearward position prior to moving the seat assembly into the seat stowage well.

A tip and kneel seat movement interlock releases the four bar link and allows the seat assembly to move forward and downwardly to a limited extent to a tip and kneel position with the seat back in a seating position. The tip and kneel seat movement release may have an interlock mechanism that prevents the seat assembly from entering the seat stowage well. The seat assembly may move in a fore-and-aft adjustment track between the forward position and the rearward position. The seat assembly should be in the rearward position prior to moving the seat assembly into the tip and kneel position. The tip and kneel interlock may comprise a sector gear having teeth that are engaged by locking pawl. The locking pawl engages the sector gear when the seat assembly is in the seating position and when the seat assembly is in the tip and kneel position. The seat back is disposed in the seating position when in the tip and kneel position.

According to another aspect of the invention, a seat assembly is provided for a vehicle that has a floor pan including a seat stowage well below a floor defining portion of the floor pan. The seat assembly comprises a seat base and a seat back that are supported on a plurality of legs relative to the floor pan. A first pair of legs are each secured on a lower end by a first lower pivot to the seat stowage well below the floor defining portion of the floor pan. The upper end of each of the first leg is secured by a first upper pivot to the seat base. A second pair of legs are each secured on a lower end by a second lower pivot to the floor defining portion of the floor pan. The upper end of each of the second legs is secured by a second upper pivot to the seat base.

A lock operates on the plurality of legs to hold the seat assembly in a selected position. The seat assembly may be locked in a seating position to provide seating for vehicle occupants. The seat may also be placed in a stowed position in which the seat base and seat back are stowed substantially completely inside the seat stowage well. The seat assembly may also be moved to a kneeling position between a seating position and the stowed position to provide increased access to portions of the vehicle behind the seat assembly.

Other aspects of the invention include providing right and left first legs on the right and left sides near the front of the seat base with right and left second legs being provided on right and left sides near the rear of the seat base. The seat back may be secured to the seat base by a pivot connector that allows the seat back to be pivoted to change the tilt angle of the seat back to the seat base. The seat back may also be folded into a position overlying the seat base for stowage of the seat assembly in the seat stowage well. An interlock may be provided for the pivot connector that prevents the seat back from pivoting relative to the seat base when the seat assembly is in the kneeling position.

A fore-and-aft position adjustment track may be provided that connects the seat base to the plurality of legs and permits adjustment of the position of the seat assembly relative to the base. The seat assembly should be placed in a rear most position relative to the legs before the seat assembly is moved to the stowed position or to the kneeling position.

These and other features and aspects of the invention will be better understood in view of the attached drawings and the following detailed description of the illustrated embodiment of the invention.

BRIEF DESCRIPTION OF THE DRAWINGS

FIG. 1 is a perspective view of a vehicle seat frame in a seating orientation;

FIG. 2 is a perspective view of a vehicle seat frame in its folded or stowage position;

FIG. 3 is a side elevation view of the vehicle seat frame attached to vehicle floor pan in the seating orientation;

FIG. 4 is a side elevation view of the vehicle seat frame attached to the vehicle floor pan in a mid-point folding position;

DETAILED DESCRIPTION OF THE PREFERRED EMBODIMENT(S)

Figure 5:
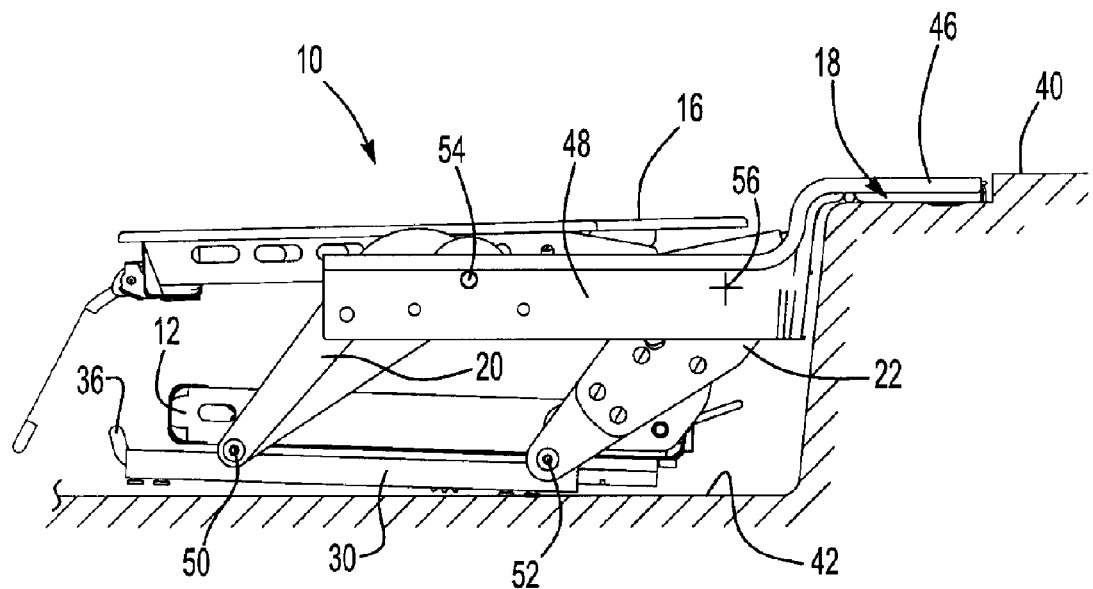
FIG. 5 is a side elevation view of the vehicle seat frame attached to the vehicle floor pan folded for stowage in a stowage well formed in the floor pan.

Referring to FIG. 1, a vehicle seat assembly frame is generally indicated by reference numeral 10. The vehicle seat normally includes foam padding and upholstery that enclose the seat assembly frame 10. The foam padding and upholstery is not shown to more clearly show the structure of the seat frame. The vehicle seat assembly 10 includes a seat base frame 12 and a seat back frame 16. A floor attachment bracket 18 is provided to secure the vehicle seat assembly 10 to a vehicle. The front leg assemblies 20 and rear leg assemblies 22 connect the seat base frame 12 to the floor attachment bracket 18. The seat base frame 12, floor attachment bracket 18, and front and rear leg assemblies 20 and 22 are pivotally interconnected to provide a four bar linkage for positioning the seat base frame 12 in a range of positions relative to the floor attachment bracket 18.

The seat assembly may also include struts 26 comprising air springs that may be used to stabilize the seat assembly as the seat assembly 10 is moved between operative positions.

A tilt/fold hinge assembly 28 interconnects the seat base frame 12 to the seat back frame 16. The tilt/fold hinge assembly permits the seat back frame 16 to be folded over the seat base frame 12 in an overlying relationship as will be more fully described below.

The tilt/fold hinge assembly 28 also allows the seat back frame 16 to be tilted relative to the seat base frame 12 for the comfort of a person sitting in the seat assembly 10. The degree of inclination of the seat back frame 16 relative to the seat base frame 12 may be adjusted by adjusting the tilt/fold hinge assembly 28.

The seat assembly 10 also includes a fore and aft adjustment track 30 in which followers 32 are provided that permit the seat base frame 12 to be moved in a range of positions fore and aft relative to the leg assemblies 20, 22. A release bar 36 may be acted upon by an occupant of the vehicle seat assembly 10 to release the followers 32 and allow the seat base frame 12 to move relative to the fore and aft adjustment track 30.

Referring to FIG. 2 the vehicle seat assembly 10 is shown in its folded position with the seat back frame 16 overlying the seat base frame 12. The front leg assemblies 20 and rear leg assemblies 22 have been rotated approximately 180° relative to the position shown in FIG. 1 so that the seat base frame 12 is below the floor attachment bracket 18. The seat base frame 12 is also forward of the position shown in FIG. 1 by reason of the rotation of the front and rear leg assemblies 20 and 22.

Referring to FIG. 3, the vehicle seat assembly 10 is shown with the seat base frame and seat back frame 16 in the same orientation as shown in FIG. 1. The seat assembly 10 is shown assembled to a floor pan 40 that includes a stowage well 42 for stowing the vehicle seat assembly 10 in a folded position. The floor attachment bracket 18 is assembled to the floor pan 40 and stowage well 42 by a floor flange 46 that engages the floor pan 40 at the nominal floor level of the floor pan 40. The nominal floor level is the portion of the floor pan that is typically carpeted or otherwise covered for cargo or for people to walk upon. The stowage well 42 is recessed below the nominal level of the floor defined by the floor pan 40. The side wall flanges 48 are secured to the sides of the stowage well 42 to provide a stable and fixed mounting base for the vehicle seat 10.

Referring to FIGS. 4 and 5, the process for folding the seat assembly 10 into the stowage well 42 is explained sequentially. The seat base frame 12, floor attachment bracket 18, front leg assemblies 20 and rear leg assemblies 22 may be attached, as previously indicated, as a four bar link. The four bar link includes a front seat base pivot 50 that interconnects the front leg assemblies 20 to the seat base frame 12. A rear seat base pivot 52 is provided between the seat base frame 12 and the rear leg assemblies 22. A front side wall pivot 54 is provided to connect the front leg assemblies 20 to the floor attachment bracket 18. Rear side wall pivot 58 is provided to connect the rear leg assemblies 22 to the floor attachment bracket 18.

As shown in FIG. 3, the front leg assemblies 20 and rear leg assemblies 22 extend in a generally vertical but rearwardly inclined orientation relative to the floor attachment bracket 18. The seat base frame 12 should be in its rear most position prior to folding the seat assembly 10 into the stowage well 42. Also as shown in FIG. 3, the seat back frame 16 is in its seating position wherein it is generally vertically arranged relative to the seat base 12 but is inclined generally rearwardly for passenger seating comfort.

Referring to FIG. 5 the seat assembly 10 is shown fully stowed in the stowage well 42. In this position, the seat base frame 12 is rotated on the front leg assemblies 20 and rear leg assemblies 22 to a position below the floor attachment bracket 18. The seat back frame 16 has been folded over the seat base frame 12 and is disposed below the nominal floor level of the floor pan 40. Cover panels (not shown) may be used to bridge any gaps between the folded seat assembly 10 and the stowage well 42 to provide an uninterrupted floor surface in conjunction with the floor pan 40.

Figure 6:
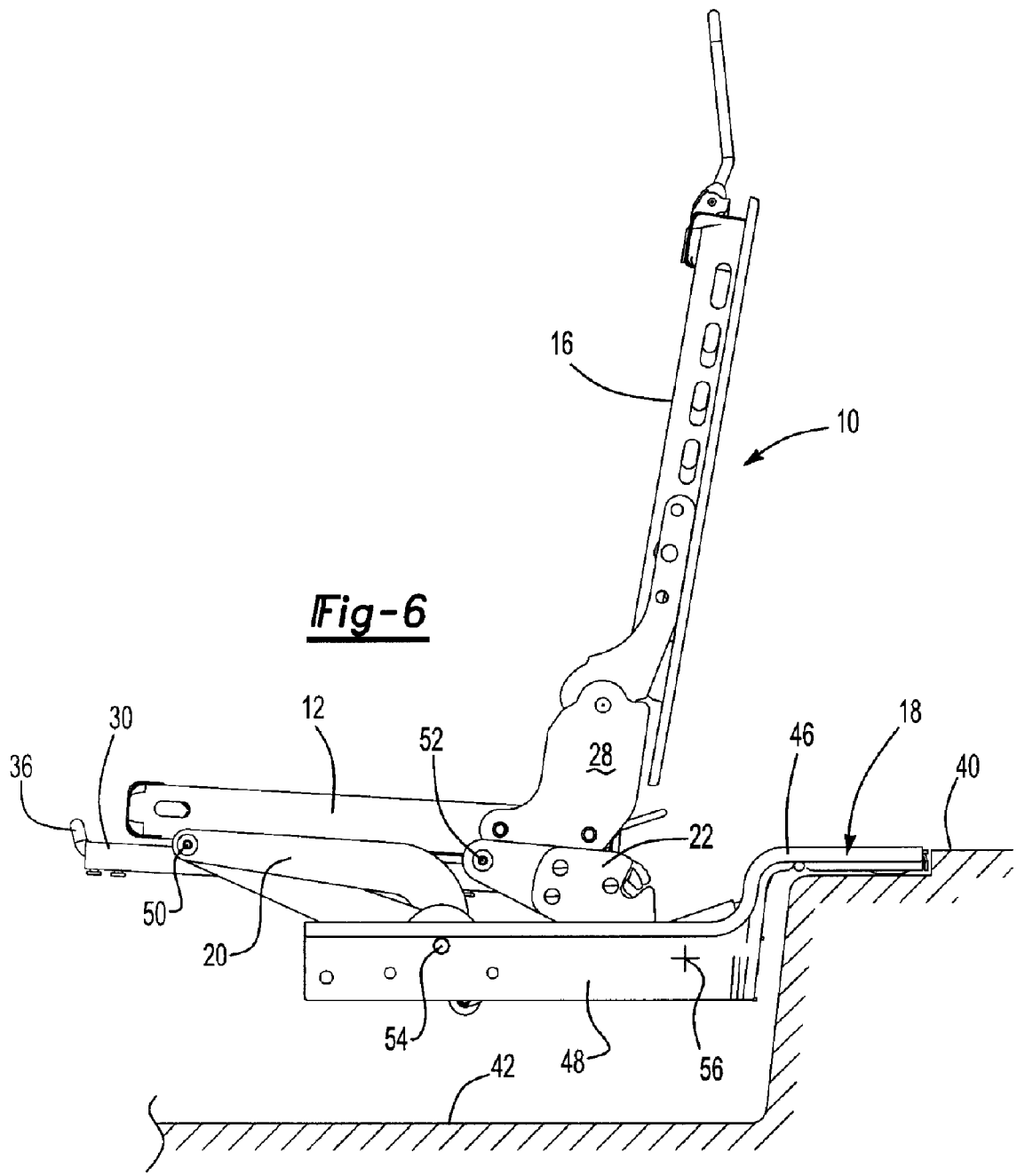
FIG. 6 is a side elevation view of the vehicle seat frame attached to the vehicle floor pan in a tip and kneel position.

Referring to FIG. 6, the seat assembly 10 is shown in its tip and kneel position in which the seat back frame 16 is tipped forwardly and the seat base frame 12 is rotated on the front leg assemblies 20 and rear leg assemblies 22 to a forward and lowered position. In this position, the seat back frame 16 is in an upright seating position but is tipped forward. The seat base frame 12 is in a lowered, or kneeling, position. In this position, improved ingress and egress is provided to the seating or storage area located behind the seat assembly 10.

Figure 7:
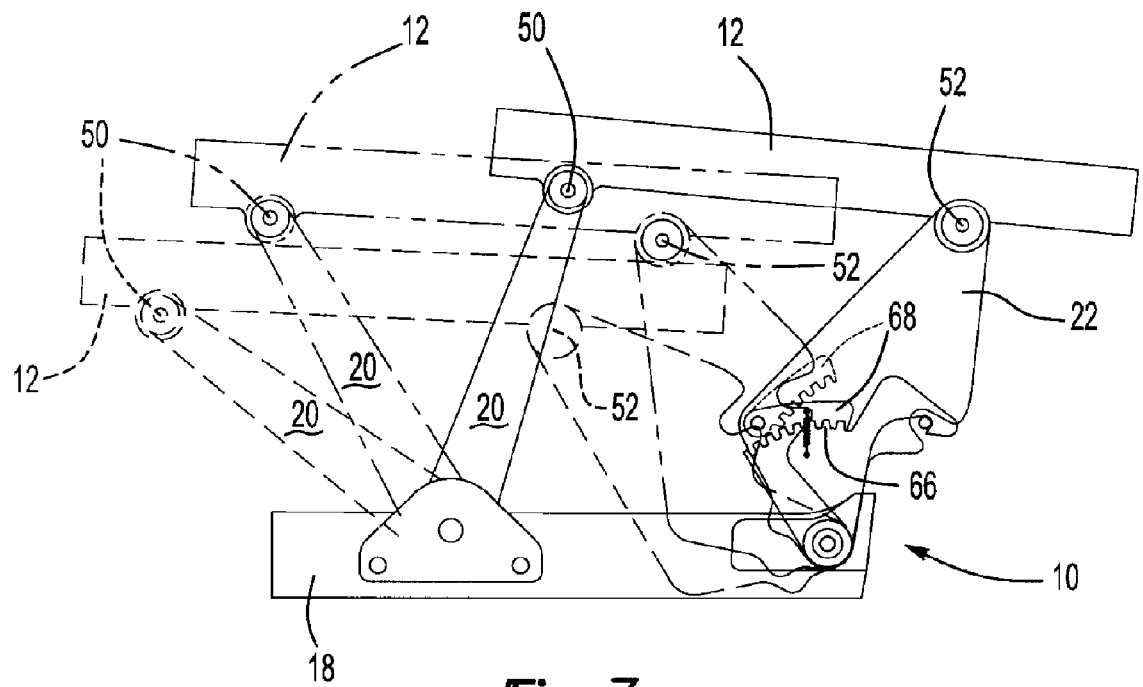
FIG. 7 is a diagrammatic view of a vehicle seat base rotated on a linkage to a kneeling position with a kneeling position lock mechanism.

Referring to FIG. 7, the seat base frame 12 is shown diagrammatically as it moves from its upright position to a tip and kneel position. The seat back frame 16 is tilted forward to a limited extent and the seat base frame 12 is rotated forwardly and downwardly on the front leg assemblies 20 and rear leg assemblies 22. A sector gear 66 may be provided as part of the rear leg assemblies 22 that is engaged by a locking pawl 68 that may be used to selectively lock the seat base frame 12 relative to the floor attachment bracket 18. The locking pawl 68 may be released by a cable or lever mechanism (not shown) and is spring biased into engagement with the sector gear 66 so that the seat base frame 12 is normally held in a locked position unless it is desired to obtain access to the area behind the seat assembly 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly for a vehicle that is assembled to a floor pan of the vehicle, the floor pan of the vehicle having a stowage well formed below the nominal floor of the vehicle, the seat assembly comprising:
    a seat;
    an articulated base that secures the seat to the floor pan;
    a locking system for locking the base in a seating position, the locking system being released in a first procedure to allow the seat to be tipped forward and downward toward the stowage well to a limited extent in an intermediate position above the stowage well;
    wherein the locking system may also be released in a second procedure to allow the seat to be stowed in the stowage well, and
    wherein the seat further comprises a seat base and a seat back, the seat back being pivoted on an axis located adjacent the lower end of the seat back and the back end of the seat base between a rearward inclined upright position and a folded position in which the seat back is positioned over the seat base in a generally parallel relationship to the seat base, and wherein the seat back may be in the upright position when the seat is in the seating position and when the seat is in the tipped forward position, and further wherein the seat back may be in the folded position when in the stowage compartment and may also be in the folded position when in a table position.

2. The seat assembly of claim 1 wherein the articulated base has a set of front legs and a set of rear legs that are connected at four pivot axes to the seat and the floor pan, the base structure forming a parallelogram that may be selectively positioned in the intermediate position and in the stowage well.

3. The seat assembly of claim 2 wherein two of the pivot axes of the base are secured in the stowage well and remain at all times below the nominal floor of the vehicle and the other two pivot axes are moved between an above floor position and a sub-floor position.

4. A seat assembly for a vehicle, the vehicle having a floor pan that includes a seat stowage well that is formed below a floor defining portion of the floor pan, the seat assembly comprising:
    a seat base;
    a seat back:
    a four bar link connecting the seat base to the floor pan of the vehicle;
    a fore-and-aft seat adjustment track being provided between the seat base and the four bar link that permits the seat base and seat back to be positioned relative to the four bar link.

5. The seat assembly of claim 4 wherein the four bar link has two lower pivot axes fixed in the stowage well and two upper pivot axes that are provided in fixed relation relative to the seat base, and wherein the two upper pivot axes move with the seat base between a seating position and a stowed position.

6. The seat assembly of claim 4 wherein the two upper pivot axes may be moved with the two upper pivot axes being rotated forward and downwardly on the two lower pivot axes to move the seat assembly toward either the stowed position or the kneeled position.

7. The seat assembly of claim 4 wherein the seat assembly moves in the fore-and-aft seat adjustment track between a forward position and a rearward position, and wherein the seat assembly should be in the rearward position prior to moving the seat assembly into the seat stowage well.

8. The seat assembly of claim 4 further comprising a tip and kneel seat movement release and interlock that releases the four bar link and allows the seat assembly to move forward and downwardly to a limited extent to a tip and kneel position and prevents the seat assembly from entering the seat stowage well.

9. The seat assembly of claim 8 wherein the seat assembly moves in the fore-and-aft seat adjustment track between a forward position and a rearward position, and wherein the seat assembly should be in the rearward position prior to moving the seat assembly into the tip and kneel position.

10. The seat assembly of claim 8 wherein the tip and kneel seat movement and interlock comprises a sector gear having teeth that are engaged by a locking pawl when the seat assembly is in its seating position and when the seat assembly is in its tip and kneel position.

11. The seat assembly of claim 8 wherein the seat back is disposed in a vertically inclined position relative to the seat base when the seat assembly is in the tip and kneel position.

12. A seat assembly for a vehicle, the vehicle having a floor pan that includes a seat stowage well that is formed below a floor defining portion of the floor pan, the seat assembly comprising:
    a seat base;
    a seat back:
    a plurality of legs supporting the seat base on the floor pan, wherein a first leg is secured on a lower end by a first lower pivot to the seat stowage well below the floor defining portion of the floor pan and wherein the upper end of the first leg is secured on an upper end by a first upper pivot to the seat base, a second leg is secured on a lower end by a second lower pivot to the floor defining portion of the floor pan and wherein the upper end of the second leg is secured on an upper end by a second upper pivot to the seat base;

a lock that operates on the plurality of legs to hold the seat assembly in a desired position, wherein the seat assembly may be locked in a seating position to provide seating for persons in the vehicle, the seat assembly may be locked in a stowed position in which the seat base and seat back are stowed substantially completely inside the seat stowage well, and the seat assembly may be locked in a kneeling position between the seating position and the stowed position to provide increased access to portions of the vehicle behind the seat assembly;

wherein the seat back is secured to the seat base by a pivot connector, wherein the seat back may be pivoted to change the tilt angle of the seat back to the seat base, and the seat back may be folded to a position overlying the seat base for stowage of the seat assembly in the seat stowage well; and an interlock is provided for the pivot connector that prevents the seat back from pivoting relative to the seat base when the seat assembly is in the kneeling position.

13. The seat assembly of claim 12 wherein the first leg comprises a right first leg and a left first leg that are provided on right and left sides near the front of the seat base, and the second leg comprises a right second leg and a left second leg that are provided on right and left sides near the rear of the seat base.

14. A seat assembly for a vehicle, the vehicle having a floor pan that includes a seat stowage well that is formed below a floor defining portion of the floor pan, the seat assembly comprising:

a seat base;
a seat back:
a plurality of legs supporting the seat base on the floor pan, wherein a first leg is secured on a lower end by a first lower pivot to the seat stowage well below the floor defining portion of the floor pan and wherein the upper end of the first leg is secured on an upper end by a first upper pivot to the seat base, a second leg is secured on a lower end by a second lower pivot to the floor defining portion of the floor pan and wherein the upper end of the second leg is secured on an upper end by a second upper pivot to the seat base;

a lock that operates on the plurality of legs to hold the seat assembly in a desired position, wherein the seat assembly may be locked in a seating position to provide seating for persons in the vehicle, the seat assembly may be locked in a stowed position in which the seat base and seat back are stowed substantially completely inside the seat stowage well, and the seat assembly may be locked in a kneeling position between the seating position and the stowed position to provide increased access to portions of the vehicle behind the seat assembly; and a fore-and-aft position adjustment track is provided for operatively connecting the seat base to the plurality of legs to permit adjustment of the position of the seat assembly relative to the base.

15. The seat assembly of claim 14 wherein the seat assembly must be placed in a rearmost position relative to the plurality of legs before the seat assembly may be moved to the stowed position.

16. The seat assembly of claim 14 wherein the seat assembly must be placed in a rearmost position relative to the plurality of legs before the seat assembly may be moved to the kneeling position.

* * * * *